United States Patent
Leonardi et al.

(10) Patent No.: US 10,998,787 B2
(45) Date of Patent: May 4, 2021

(54) HAIRPIN WINDING ELECTRIC MACHINE WITH STAGGERED HAIRPIN CONNECTIONS

(71) Applicant: Ford Global Technologies, LLC, Dearborn, MI (US)

(72) Inventors: Franco Leonardi, Dearborn Heights, MI (US); Feng Liang, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 184 days.

(21) Appl. No.: 15/919,901

(22) Filed: Mar. 13, 2018

(65) Prior Publication Data

US 2019/0288574 A1    Sep. 19, 2019

(51) Int. Cl.
*H02K 3/28*     (2006.01)
*H02K 1/16*     (2006.01)
*H02K 15/02*    (2006.01)
*H02K 15/04*    (2006.01)
*H02K 3/12*     (2006.01)

(52) U.S. Cl.
CPC ............... *H02K 3/28* (2013.01); *H02K 1/16* (2013.01); *H02K 3/12* (2013.01); *H02K 15/024* (2013.01); *H02K 15/0421* (2013.01); *H02K 2213/03* (2013.01)

(58) Field of Classification Search
CPC .. H02K 3/04; H02K 3/12; H02K 3/28; H02K 3/505; H02K 15/02; H02K 15/024; H02K 15/04; H02K 15/0414; H02K 15/0421; H02K 15/063; H02K 15/064
USPC ........................................ 310/198, 201, 208
See application file for complete search history.

(56) References Cited

U.S. PATENT DOCUMENTS

| | | | |
|---|---|---|---|
| 5,191,250 A | * | 3/1993 | Kobayashi ............. H02K 1/265 310/198 |
| 6,339,871 B1 | | 1/2002 | Maesoba et al. |
| 6,557,239 B2 | | 5/2003 | Takahashi et al. |
| 7,348,705 B2 | | 3/2008 | Cai et al. |
| 7,622,843 B2 | | 11/2009 | Cai |
| 7,721,413 B2 | | 5/2010 | Guercioni |
| 7,923,885 B2 | | 4/2011 | Ogawa et al. |
| 8,443,509 B1 | | 5/2013 | De Souza et al. |
| 9,252,645 B2 | | 2/2016 | Crane |

(Continued)

FOREIGN PATENT DOCUMENTS

| | | | |
|---|---|---|---|
| JP | 200406825 A | 2/2004 | |
| JP | 2004064825 A | * 2/2004 | ............... H02K 3/47 |

(Continued)

OTHER PUBLICATIONS

P-2004064825-A (English Translation) (Year: 2004).*

*Primary Examiner* — Quyen P Leung
*Assistant Examiner* — Alexander Moraza
(74) *Attorney, Agent, or Firm* — David B Kelley; Brooks Kushman P.C.

(57) ABSTRACT

An electric machine includes a stator core defining slots and hairpins disposed in the slots. The hairpins are selectively joined at connections to form windings that include at least first and second radial layers. Each connection is disposed in one of the layers. The connections are staggered such that the connections of the first layer are circumferentially offset from the connections of the second layer to increase clearance for tooling that forms the connections.

18 Claims, 7 Drawing Sheets

(56) References Cited

U.S. PATENT DOCUMENTS

| | | |
|---|---|---|
| 9,379,586 B2 | 6/2016 | Rahman et al. |
| 9,520,753 B2 | 12/2016 | Rahman et al. |
| 10,305,354 B2 | 5/2019 | Niccolini et al. |
| 2002/0093266 A1* | 7/2002 | Buening .................. H02K 3/28 310/198 |
| 2003/0214190 A1 | 11/2003 | Congdon et al. |
| 2003/0214196 A1* | 11/2003 | Cai .......................... H02K 3/14 310/208 |
| 2013/0076175 A1 | 3/2013 | Turnbull et al. |
| 2013/0187494 A1 | 7/2013 | Hamer et al. |
| 2014/0077636 A1 | 3/2014 | Jung |
| 2014/0184011 A1 | 7/2014 | Kaimori et al. |
| 2014/0319953 A1* | 10/2014 | Rahman .................. H02K 3/28 310/198 |
| 2016/0164359 A1 | 6/2016 | Han et al. |
| 2016/0285334 A1 | 9/2016 | Turnbull et al. |
| 2017/0353072 A1* | 12/2017 | McSheery ............ H02K 41/033 |
| 2018/0175690 A1 | 6/2018 | Lange et al. |
| 2020/0169149 A1 | 5/2020 | Liang et al. |

FOREIGN PATENT DOCUMENTS

| | | | |
|---|---|---|---|
| KR | 20140064230 | A | 5/2014 |
| WO | 2017168971 | A1 | 10/2017 |

* cited by examiner

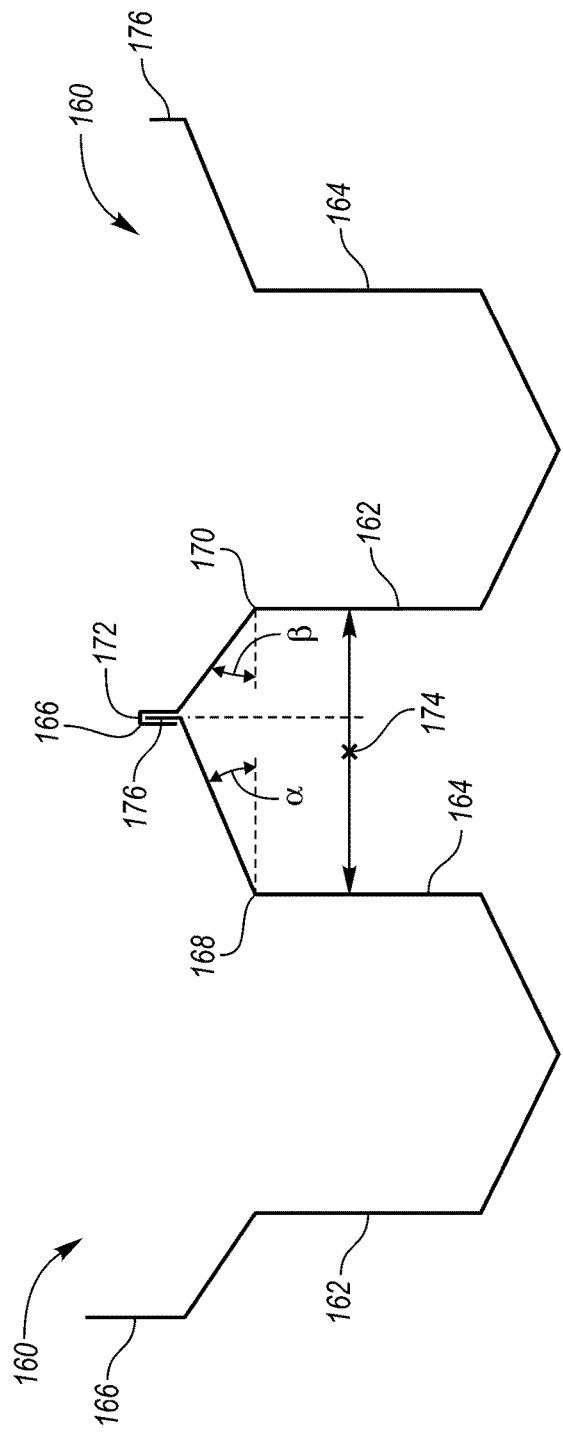
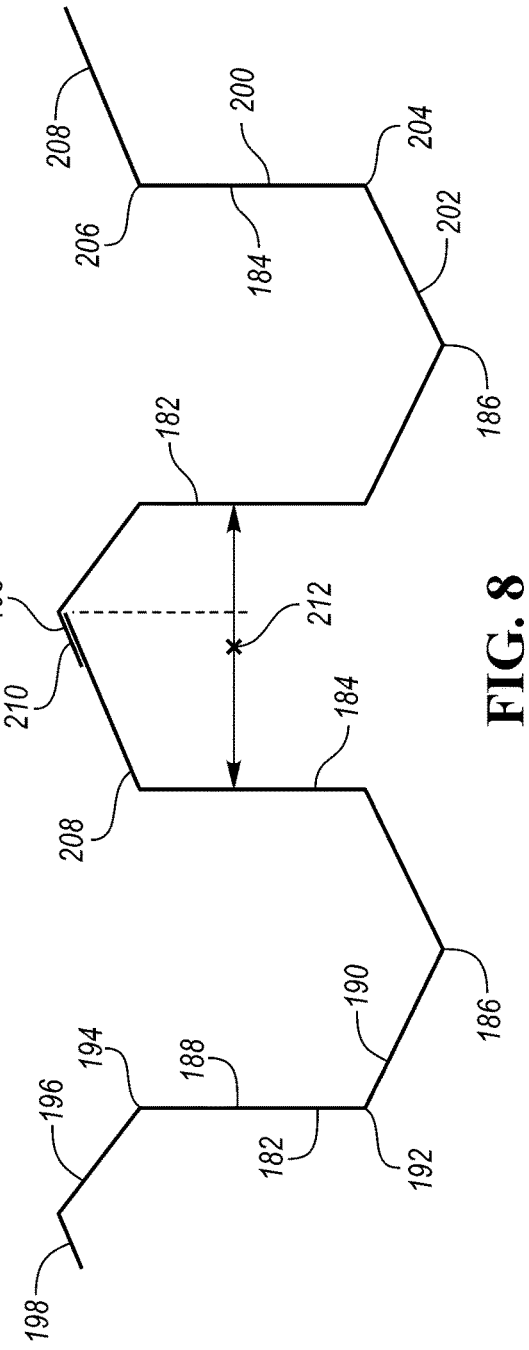

US 10,998,787 B2

HAIRPIN WINDING ELECTRIC MACHINE WITH STAGGERED HAIRPIN CONNECTIONS

TECHNICAL FIELD

The present disclosure relates to electric machines and more specifically to electric machines that include hairpin windings.

BACKGROUND

Vehicles such as battery-electric vehicles and hybrid-electric vehicles contain a traction-battery assembly to act as an energy source for the vehicle. The traction battery may include components and systems to assist in managing vehicle performance and operations. The traction battery may also include high-voltage components, and an air or liquid thermal-management system to control the temperature of the battery. The traction battery is electrically connected to an electric machine that provides torque to driven wheels. Electric machines typically include a stator and a rotor that cooperate to convert electrical energy into mechanical motion or vice versa.

SUMMARY

According to one embodiment, an electric machine includes a stator core defining slots and hairpins disposed in the slots. The hairpins are selectively joined at connections to form windings that include at least first and second radial layers. Each connection is disposed in one of the layers. The connections are staggered such that the connections of the first layer are circumferentially offset from the connections of the second layer to increase clearance for tooling that forms the connections.

According to another embodiment, an electric machine includes a stator core defining slots, and windings including a plurality of winding paths corresponding to one of three phases of the electric machine. Each winding path includes interconnected hairpins that each have a first leg and a second leg that is longer than the first leg. Each of the hairpins are disposed in the slots with the first and second legs extending through corresponding ones of the slots. Adjacent pairs of first and second ones of the hairpins are interconnected such that the first leg of the first hairpin is joined to the second leg of the second hairpin at a connection. The first leg of the first hairpin is circumferentially spaced from the second leg of the second hairpin by a span of slots, and the connection is offset from a midpoint of the span due to the second leg being longer than the first leg.

According to yet another embodiment, a method of manufacturing a stator includes providing a stator core defining slots, and bending a plurality of elongate blanks, that each have first and second ends and a midpoint, to form hairpins that each have a vertex at a location that is offset from the midpoint, a first leg defined between the first end and the vertex, and a second leg defined between the second end and the vertex and being longer than the first leg. The method further includes installing the hairpins in the stator core by inserting the first and second legs into corresponding ones of the slots, and joining each of the first legs to a corresponding one of the second legs to interconnect the hairpins to form a winding path.

BRIEF DESCRIPTION OF THE DRAWINGS

FIG. 7 is a schematic diagram of an adjacent pair of interconnected pins according to another embodiment.

FIG. 8 is a schematic diagram of an adjacent pair of interconnected pins according to yet another embodiment.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
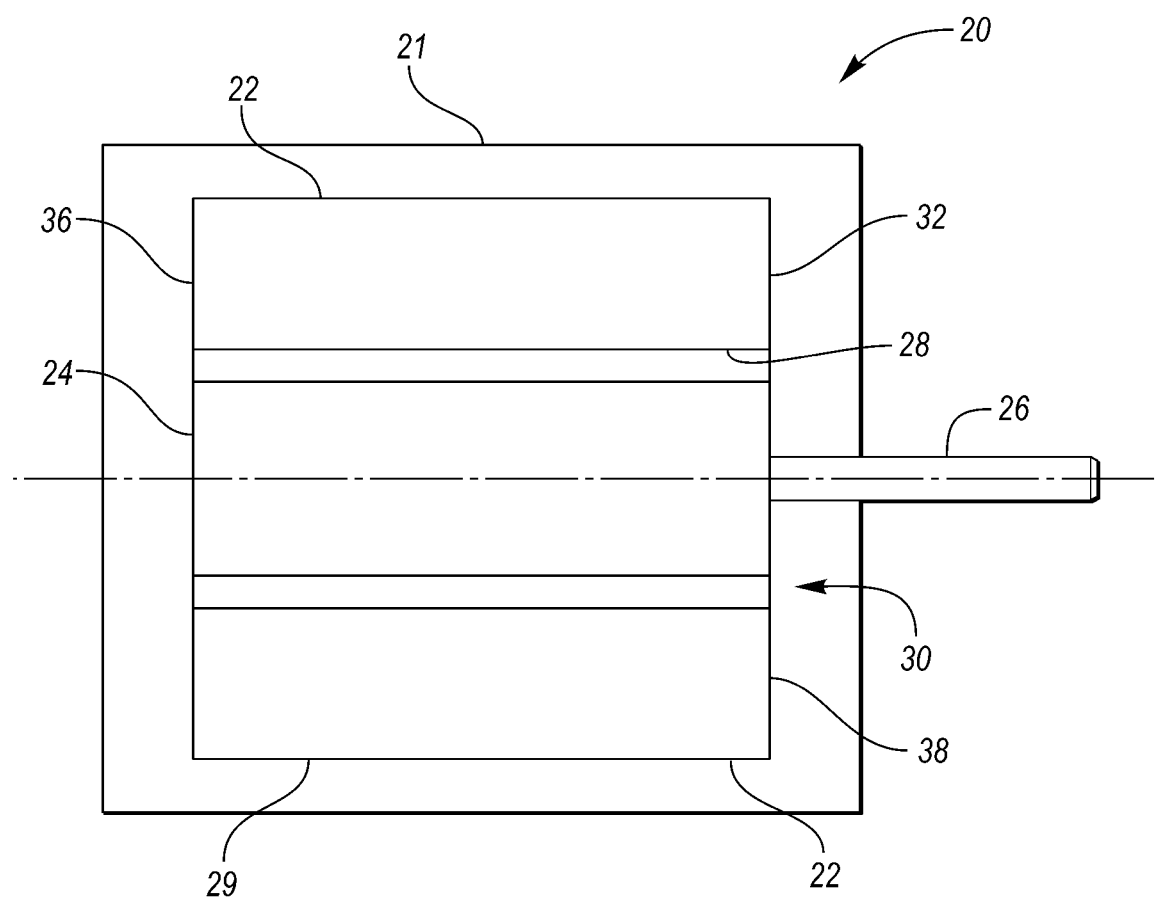
FIG. 1 is a schematic diagram of an electric machine.

Referring to FIG. 1, an electric machine 20 may be used in a vehicle such as a fully electric vehicle or a hybrid-electric vehicle. The electric machine 20 may be referred to as an electric motor, a traction motor, a generator, or the like. The electric machine 20 may be a permanent magnet machine, an induction machine, a synchronous machine, or the like. The electric machine 20 is capable of acting as both a motor to propel the vehicle and as a generator such as during regenerative braking.

The electric machine 20 may be powered by a traction battery of the vehicle. The traction battery may provide a high-voltage direct current (DC) output from one or more battery-cell arrays, sometimes referred to as battery-cell stacks, within the traction battery. The battery-cell arrays may include one or more battery cells that convert stored chemical energy to electrical energy. The cells may include a housing, a positive electrode (cathode), and a negative electrode (anode). An electrolyte allows ions to move between the anode and cathode during discharge, and then return during recharge. Terminals allow current to flow out of the cells for use by the vehicle.

The traction battery may be electrically connected to one or more power electronics modules. The power electronics modules may be electrically connected to the electric machines 20 and may provide the ability to bi-directionally transfer electrical energy between the traction battery and the electric machine. For example, a typical traction battery may provide a DC voltage while the electric machine 20 may require a three-phase alternating current (AC) voltage to function. The power electronics module may include an inverter that converts the DC voltage to a three-phase AC voltage as required by the electric machine 20. In a regenerative mode, the power electronics module may convert the three-phase AC voltage from the electric machine 20 acting as generators to the DC voltage required by the traction battery.

Figure 2:
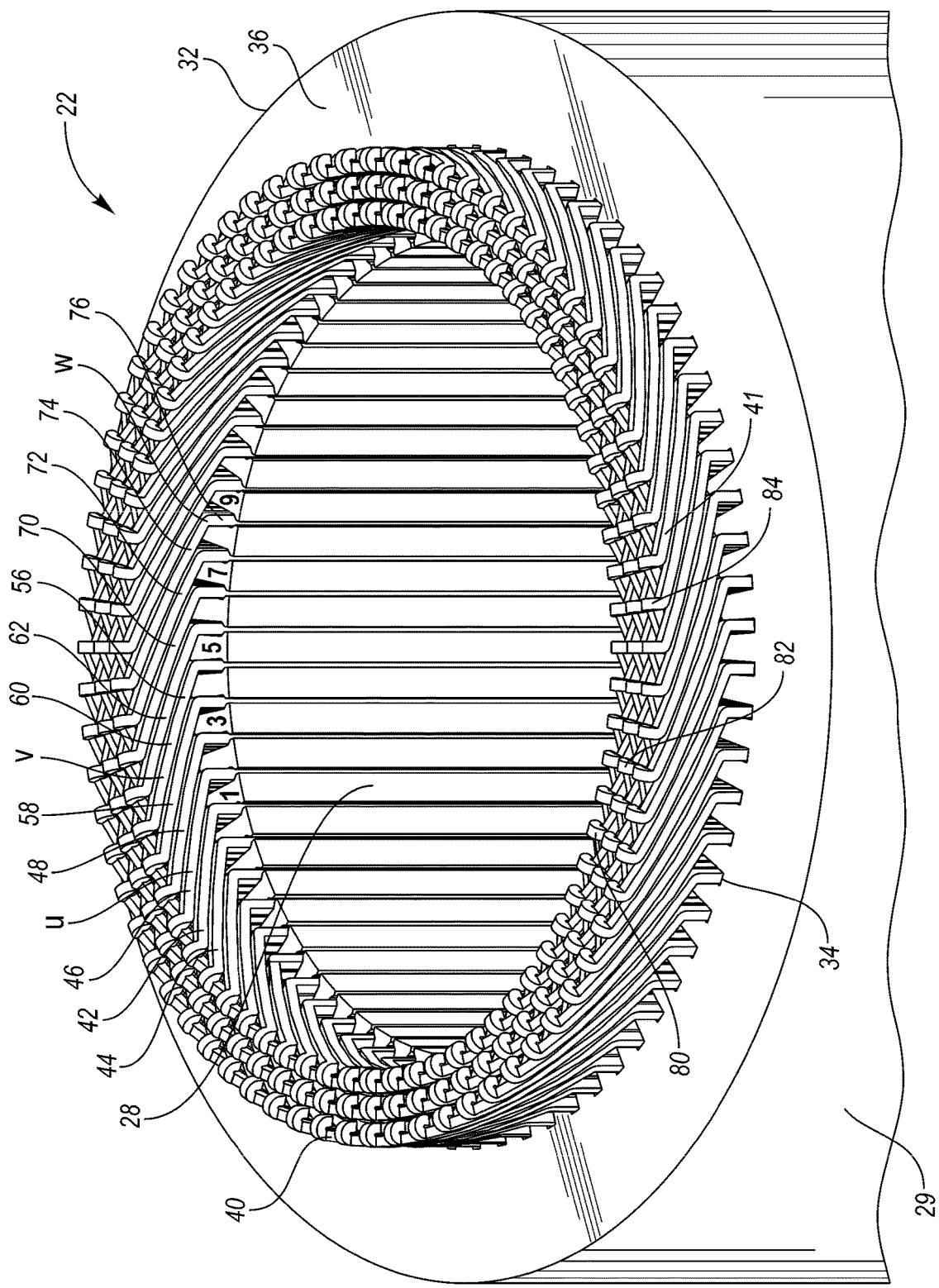
FIG. 2 is a perspective view of one end of a stator of the electric machine.

Referring to FIGS. 1 and 2, the electric machine 20 includes a housing 21 that encloses the stator 22 and the rotor 24. The stator 22 is fixed to the housing 21 and includes a cylindrical core stator 32 having an inner diameter 28 that defines a hole 30 and an outer diameter 29. The rotor 24 is supported for rotation within the hole 30. The rotor 24 may include windings or permanent magnets that interact with winding of the stator 22 to generate rotation of the rotor 24 when the electric machine 20 is energized. The rotor 24 may be supported on a driveshaft 26 that extends through the housing 21. The driveshaft 26 is configured to couple with a drivetrain of the vehicle.

The stator core 32 defines slots 34 circumferentially arranged around the core 32 and extending outward from the inner diameter 28. The slots 34 may be equally spaced around the circumference and extend axially from a first end 36 of the core 32 to a second end 38. In the illustrated embodiment, the core 32 defines seventy-two slots and has eight poles, but the core 32 may include more or fewer slots and/or poles in other embodiments. For example, the core 32 may define thirty-six slots and have four poles.

The slots 34 are spaced by a circumferential distance measured between the center lines of two adjacent slots. This distance can be used as a unit of distance (hereinafter "a slot") for relating and measuring other components of the stator 22. The distance unit "slot" (sometimes also referred to as "slot pitch") can be further broken down into factions, e.g., two components may be spaced by half a slot.

The electric machine 20 may include hairpin windings 40 extending through the slots 34 of the core 32. Hairpin windings are an emerging technology that improves efficiency for electric machines used in vehicles. The hairpin windings 40 improve efficiency by providing a greater mass of stator conductors to reduce resistance of the windings 40 without encroaching into space reserved for the electrical steel and the magnetic flux path. The hairpin windings 40 may be wave windings in which the windings 40 weave pole to pole in a wave-like pattern.

One challenge with hairpin windings is matching the electric machine design to the desired torque-speed curve. An essential step in designing an electric machine is selecting the phase turn number so that the torque-speed curve covers all required operating points. For conventional stranded windings made of flexible thin copper conductors connected in parallel, the desired phase turn number is selected by choosing the number of turns per coil, the number of parallel paths, the number of poles, the number of slots per pole, and the number of layers. While all these factors are also available for hairpin windings, the limiting factors are very different resulting in fewer feasible choices.

For example, while the possible number of poles, slots per pole, and layers are identical between the two technologies, it is not practical in a hairpin winding to have as many turns per coil as in a stranded winding. Each hairpin needs to be connected to the next hairpin by welding, soldering or the like, and needs to be bent according to a specific shape in order to make the connection possible. This limits the number and size of the conductors that can be fit in a single slot. Another challenge is creating parallel circuits that are balanced (i.e., not causing large circulating currents in the loop formed by the parallel circuits due do dissymmetry) and have reasonably complex connections. A third challenge is making the connections, e.g., welds, between the individual hairpins due to small tool clearance. This becomes more problematic as the number of hairpins per slot increases.

The electric machine 20 solves these and other problems. The electric machine 20 may be a three-phase machine in which the hairpin windings 40 are arranged to have a U phase, a V phase, and a W phase. Each phase includes associated hairpins conductors (also known as pins, hairpins, and bar conductors) arranged in one or more parallel paths of windings. In the illustrated embodiment, each phase includes three parallel paths, but other arrangements are contemplated. The hairpins are generally U-shaped and include a pair of legs joined at a vertex. The hairpins are installed in the stator core 32 by inserting the legs through corresponding ones of the slots 34. All of the hairpins may be installed from the same end of the stator core 32, e.g., end 36, so that all of the vertexes are located on one end of the stator, e.g., end 36, and the ends of the legs are located on the other end, e.g., end 38. Once installed, the legs of each hairpin are bent away from each other to connect with the legs of other hairpins. The ends of corresponding hairpins are joined by a connection.

In one embodiment, the U phase may include a plurality of hairpins 42 that are selectively connected to form a first path 44, a second path 46, and a third path 48. Each of the paths includes a first end that starts at a terminal and a second end that ends at a neutral connection. The paths 44, 46, 48 are connected to each other at the terminal and at the neutral connection, but are otherwise electrically isolated from each other. Each of the paths encircles the stator core 32 by weaving in and out of corresponding ones of the slots 34.

The V phase may include a plurality of hairpins 56 that are selectively interconnected to form a first path 58, a second path 60, and a third path 62, respectively. Each of the paths includes a first end that starts at a terminal and a second end that ends at a neutral connection. The paths 58, 60, 62 are connected to each other at the terminal and at the neutral connection but are otherwise electrically isolated from each other. Each of the paths encircles the stator core 32 by weaving in and out of select ones of the slots 34.

The W phase may include a plurality of hairpins 70 that are selectively interconnected to form a first path 72, a second path 74, and a third path 76, respectively. Each of the paths includes a first end that starts at a terminal and a second end that ends at a neutral connection. Three neutral connection (one for each phase) or a single neutral connection may be used to connect all nine paths. The paths 72, 74, 76 are connected to each other at the terminal and at the neutral connection but are otherwise electrically isolated from each other. Each of the paths encircles the stator core 32 by weaving in and out of select ones of the slots 34. The terminals are connected to the inverter and receive voltage from the inverter, which creates torque-producing current in the windings 40 causing the rotor 24 to rotate within the stator 22. In other embodiments, each phase may include more than or less than three paths. For example, each phase may include a single path or two parallel paths.

Figure 3:
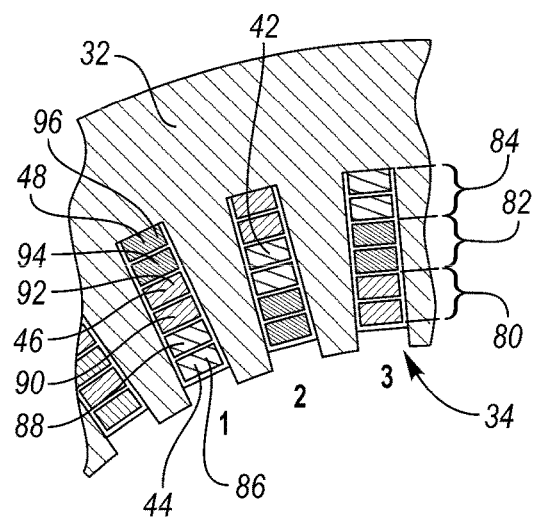
FIG. 3 is a cross-sectional view of a portion of the stator.

Referring to FIGS. 2 and 3, the slots 34 are arranged 1 through 72 in the clockwise direction with the odd number slots 1-9 of pole 1 being labeled for convenience. (Numbers are located to the right of their slot.) Each of the two end windings 41 of the windings 40 may be arranged in three radial layers: an inner layer 80, a middle layer 82, and an outer layer 84. The radial layers 80, 82, 84 encircle their corresponding one of the ends 36, 38 of the stator core 32 and may be substantially concentric with the stator core 32.

The slots 34 may include radial positions. The positions may be sequential and in a one-by-n linear arrangement. In the illustrated embodiment, each slot 34 has six positions: a first position 86, a second position 88, a third position 90, a fourth position 92, a fifth position 94, and a sixth position 96. The first position 86 is nearest to the inner diameter 28 and the sixth position 96 is nearest to the outer diameter 29. The first and second positions 86, 88 are associated with the inner layers 80, the third and fourth positions 90, 92 are associated with the middle layers 82, and the fifth and sixth positions 94, 96 are associated with the outer layers 84. Each of the layers are comprised of associated hairpins that have legs disposed in the slot positions associated with that layer. For example, hairpins associated with the inner layer 80 are disposed within the first and/or second slot positions 86, 88.

The electric machine 20 may be balanced with each of the paths being configured to carry a same amount of current. The phases U, V, W may be arranged in groups to occupy sequential slots in each of the poles. In pole 1 (slots 1-9), for example, the U phase occupies slots 1-3, the V phase occupies slots 4-6, and the W phase occupies slots 7-9. The paths may contain a same number of hairpins in each of the layers 80, 82, 84.

Each of the winding paths may be comprised of a single type of hairpin or multiple types of hairpins. Each of the paths may also include a terminal hairpin and a neutral-connection hairpin. In embodiments with multiple types of hairpins, the paths may include regular hairpins, turnaround hairpins, carryover hairpins, and short-pitch hairpins. Each of the paths may not include all types of hairpins. Applicant's co-pending U.S. application Ser. No. 15/871,615 filed Jan. 15, 2018, the contents of which are hereby incorporated by reference in its entirety herein, includes a more detailed discussion of an example electric machine that includes multiple types of hairpins.

Figure 4:
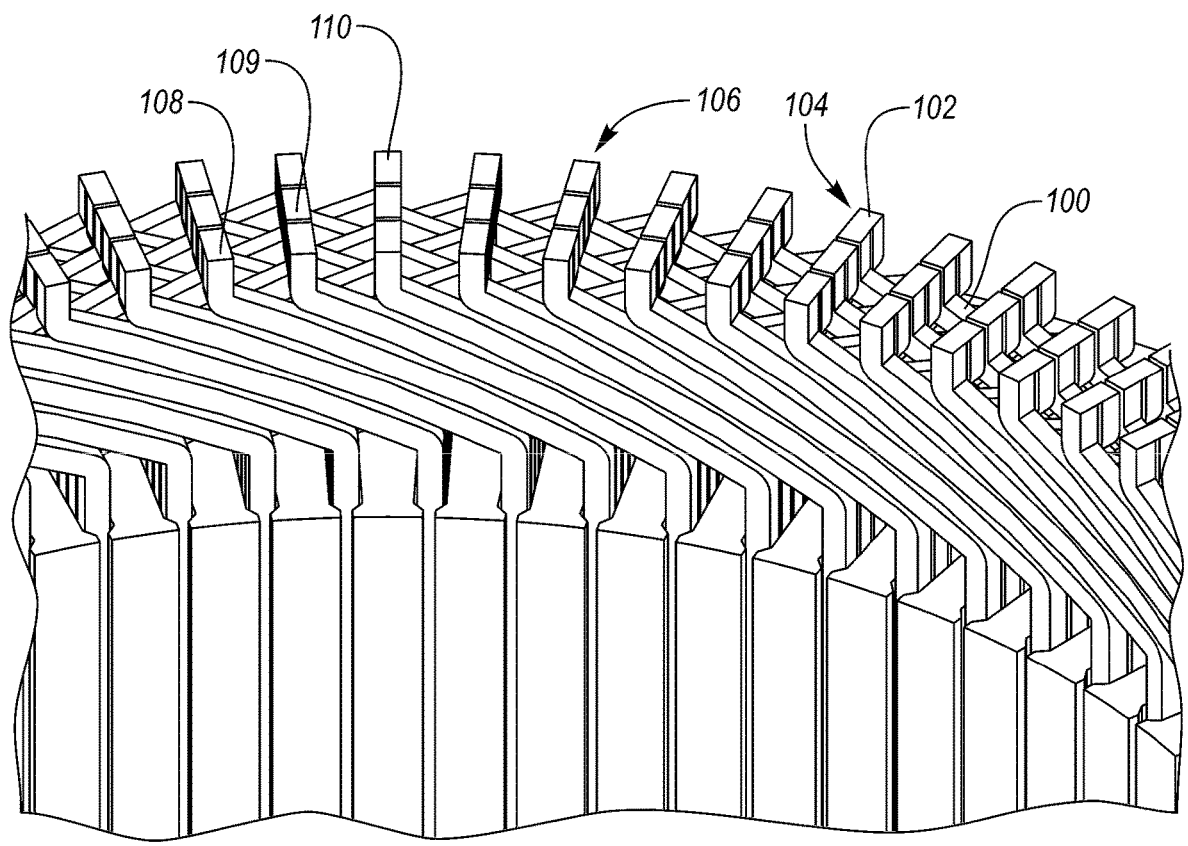
FIG. 4 is a partial perspective view of a prior-art stator.

Referring to FIG. 4 (Prior Art), the ends 102 of the pins 100 are joined together at a connection 104. The connection 104 is typically formed by welding, such as laser welding, and requires the ends 102 of the hairpins 100 to be held together by a tool while the ends 102 are welded together. The connections 104 are aligned in radially extending rows 106, i.e., the connections 104 of the inner layer 108, the middle layer 109, and the outer layer 110 are in radial alignment. The rows 106 are spaced apart by 1 slot. The aligned arrangement leaves little clearance for the welding tool. This is especially true for stators having thirty-six or more slots and/or three or more radial layers.

Figure 5:
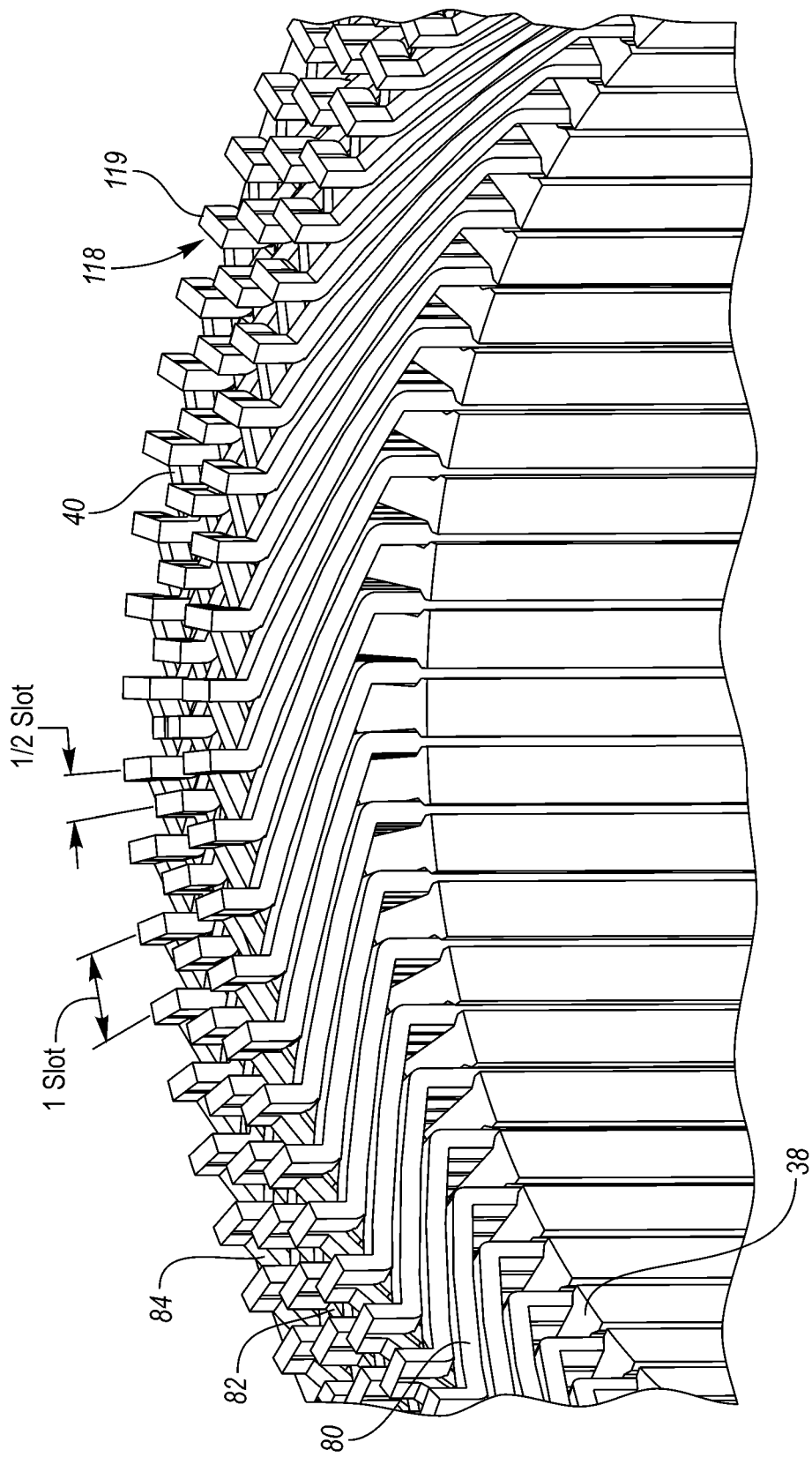
FIG. 5 is a partial perspective view of the other end of the stator of FIG. 2.

Referring to FIG. 5, the paths are formed by joining the ends 119 of select hairpins at a connection 118. The connection 118 may be formed by welding, soldering, or the like. Laser welding is the most common connection method, and therefore, the connections are commonly called welds. Within each of the layers 80, 82, 84, the connections 118 are designed to be circumferentially aligned with a consistent spacing between the connections. In the illustrated embodiment, the spacing is 1 slot.

The stator 22 has staggered connections 118 to increase clearance for connecting the ends 119 of the hairpins. In the illustrated embodiment, the connections 118 of the inner and outer layers 80, 84 are radially aligned and the connections 118 of the middle layer 82 are offset. Other combinations are possible. In the illustrated example, the inner and outer layers 80, 84 may be shifted a quarter slot in the clockwise direction and the middle layer 82 may be shifted a quarter slot in the counterclockwise direction as compared to the traditional design shown in FIG. 4. This offsets the connections 118 of the inner and outer layers 80, 84 from the connections 118 of the middle layer 82 by a half slot. Applicant has found that shifting the connections 118 by a quarter slot optimizes the clearance between the connections 118. The staggered arrangement provides additional clearance for tooling to join the hairpins together, which improves manufacturability of the electric machine 20. While a quarter slot shift has been found to be optimal, others shifts may be used in other embodiments. In an alternative embodiment, the connections of inner and outer layers may stay centered and the connections of the middle layer is shifted.

Figure 6:
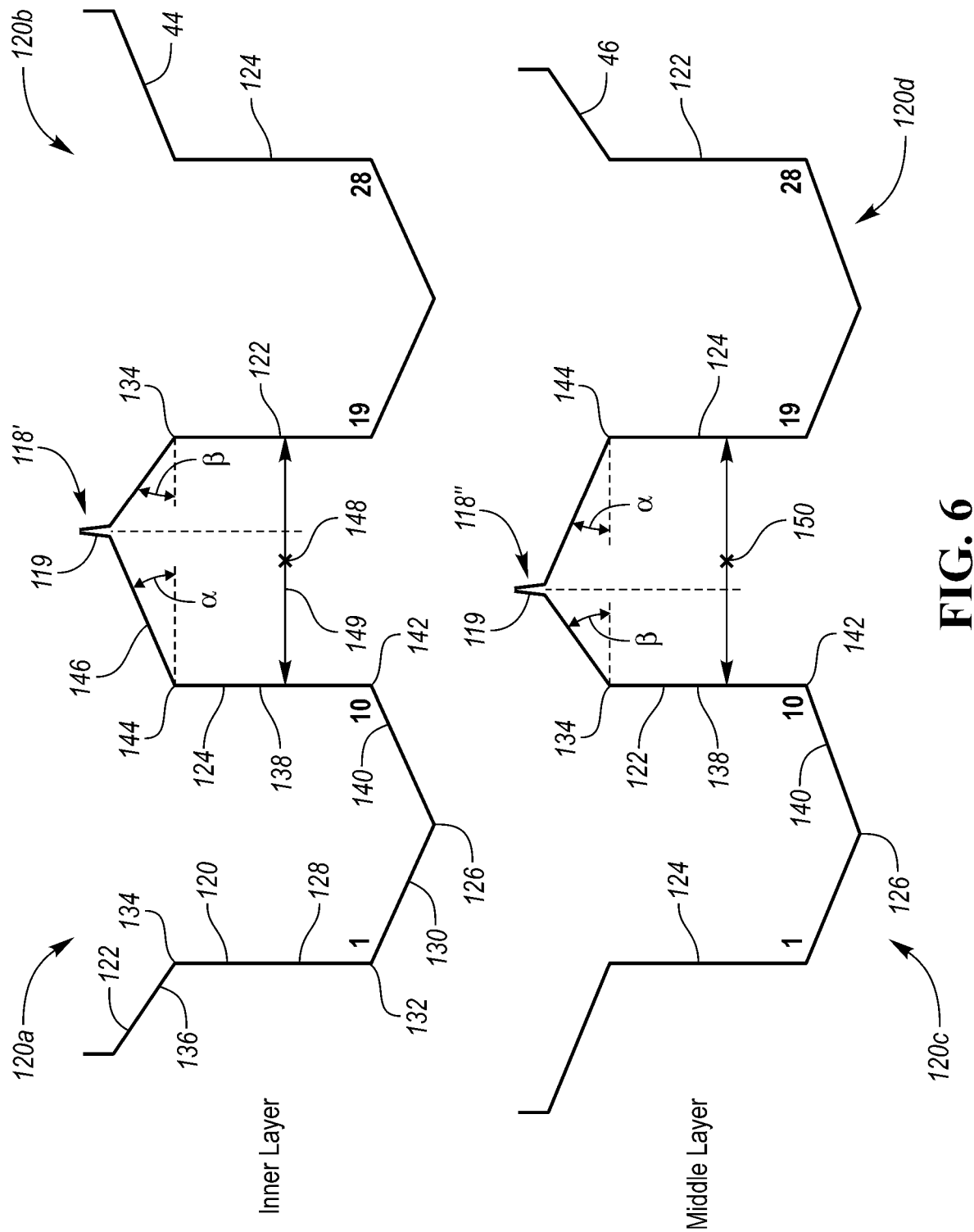
FIG. 6 is a schematic diagram of an adjacent pair of interconnected pins.

Referring to FIG. 6, the staggered connections may be created by modifying the design of the hairpins so that the connections 118 are not located at midpoints of the pin spans. This modification will be explained with reference to the regular hairpins 120, but the modification may also be present on the other types of hairpins if the electric machine includes multiple types of hairpins.

The regular hairpins 120 may include a first leg 122 joined to a second leg 124 at a vertex 126. The hairpins 120 may be formed from a single piece of metal such as copper, aluminum, or silver, or any other electrically conductive material. The vertex 126 may radially offset the legs 122, 124 so that the legs are disposed in different slot positions, e.g., if the hairpin 120 is in the inner layer 80, the first leg 122 may be in the first position 86 and the second leg in the second position 88. The vertex 126 may be formed by a twist that radially offset the legs by approximately the dimension of one pin in the radial direction.

The first leg 122 includes a straight portion 128 that is disposed within one of the slots 34 and a first angled portion 130 that extends between the vertex 126 and the straight portion 128. The straight portion 128 and the angled portion 130 are joined at a first bend 132. The first leg 122 also includes a connection segment 136 that is angled outward at a second bend 134.

The second leg 124 includes a straight portion 138 that is disposed within one of the slots 34 and a first angled portion 140 that extends between the vertex 126 and the straight portion 138. The straight portion 138 and the angled portion 140 are joined at a first bend 142. The second leg 124 also includes a connection segment 146 that is angled outward at a second bend 144. The connection segments 136, 146 angle in opposite directions to extend away from the pin 120 to connect with other hairpins of a same path.

The first leg 122 is disposed in one of the slots 34 and the second leg 124 is disposed in another of the slots 34 that is spaced apart by a span of slots. The regular hairpins 120 may have a span of slots that is equal to the number of slots per pole, which is nine slots in the illustrated embodiment. Thus, if the first leg 122 was in slot 1, the second leg 124 would be in slot 10.

The connections 118 may be shifted by making one of the legs 122, 124 longer than the other. The legs may achieve unequal length by forming the vertex 126 at a non-midpoint of a pin blank. In the illustrated embodiment, the second leg 124 is longer than the first leg 122. More specifically, the weld segment 136 of the first leg 122 is shorter than the weld segment 146 of the second leg 124 while the straight portions remain equal length. The angle (alpha) at the bend 144 of the second leg 124 is smaller than the angle (beta) of bend 134 of the first leg 122 so that the ends 119 are located at a same axial offset from the vertex 126.

As explained above, the paths are formed by joining select pairs of the hairpins together, e.g., welding the ends 119 to each other. FIG. 6 shows one adjacent pair of hairpins (120*a* and 120*b*) of path 44 that are located in the inner layer 80, and one adjacent pair of hairpins (120*c* and 120*d*) of path 46 that are located in the middle layer 82. The first leg 122 of hairpin 120*a* is disposed in the first position 86 of slot 1 and the second leg 124 is disposed in the second position 88 of slot 10. The first leg 122 of hairpin 120*b* is disposed in the first position 86 of slot 19 and the second leg 124 is disposed in the second position 88 of slot 28. The second leg 124 of hairpin 120a is joined to the first leg 122 of hairpin 120b at connection 118'. The connection 118' is shifted to the right due to the unequal length legs and the different bend angles alpha and beta. In the traditional design shown in FIG. 4, the legs of the hairpins are the same which places the connections in the middle of the span, e.g., 4.5 slots. Here, however, the connection 118' is 4.75 slots from slot 10 and 4.25 slots from slot 19, which shifts the connection 118' a quarter slot to the right of the midpoint 148 of the span 149. (Note: the figure shows the shift exaggerated for illustrative purposes.)

The second leg 124 of hairpin 120c is disposed in the third position 90 of slot 1 and the first leg 122 is disposed in the fourth position 92 of slot 10. The second leg 124 of hairpin 120d is disposed in the third position 90 of slot 19 and the first leg 122 is disposed in the fourth position 92 of slot 28. The second leg 124 of hairpin 120d is joined to the first leg 122 of hairpin 120c at connection 118". The connection 118" is shifted to the left due to the unequal length legs and the different bend angles alpha and beta. The connection 118' is 4.25 slots from slot 10 and 4.75 slots from slot 19, which shifts the connection 118' a quarter slot to the left of the midpoint 150 of span 151.

The connections 118' and 118" are shifted in opposite directions by installing the hairpins 120 is different orientations in the different layers 80, 82. In the illustrated example, the connections 118' are shifted to the right by installing the hairpins with the second leg 124 being on the right. The hairpins of layer 82 are installed in the opposite orientation with the second legs 124 being on the left. This may be referred to as a flipped orientation. These quarter slot shifts of connections 118' and 118" create a half slot circumferential offset between the connections 118' and 118". This disclosure is not limited to the illustrated quarter slot shift. While not illustrated, the hairpins of the outer layer 84 may be arranged similar to the inner layer 80 so that the connections of the inner and outer layers are radially aligned as shown in FIG. 5.

In an alternative embodiment, the legs 122 and 124 may be a same length but bent at the different angles (alpha and beta) so that the legs 122 and 124 intersect at a location shifted from the midpoint 148 or 150. The second leg 124 may then be trimmed so that the ends 119 are adjacent to each other. The second legs 124 may be trimmed before or after joining.

FIG. 7 illustrates hairpins 160 according to another embodiment, which is similar to the hairpins 120 of FIG. 6. The hairpins 160 have equal length legs 162, 164. The legs 164 may be the same as the legs 124 described above. The legs 162 may have the same shape as the legs 122 described above but have an end segment 166 that is longer. Similar to the hairpins 120, the alpha and beta angles at the bends 168 and 170 shift the connection 172 to be offset from a midpoint of the span 174, e.g., a quarter slot right. The connection 172 is different than the connection 118 and includes folding a portion of the end segment 166 over the end segment 176 of the second leg 164. The folded-over portion of the leg 162 may be crimped to the leg 164. The legs 162 and 164 may be additionally joined by welding, soldering, or the like. In some embodiments, the legs are only welded or crimped.

FIG. 8 illustrates hairpins 180 according to yet another embodiment. Each hairpin 180 includes a first leg 182 and a second leg 184. The legs 182 and 184 may be a same length or may be a different length. The legs 182, 184 are joined at a vertex 186. The first leg 182 includes a straight portion 188 and a first angled portion 190 that extends between the vertex 186 and the straight portion 188. The straight portion 188 and the angled portion 190 are joined at a first bend 192. The first leg 182 also includes a second angled portion 196 joined to the straight portion 188 at a second bend 194. A connection segment 198 includes the end of the leg 182 and extends from the second angled portion 196 back towards the stator 22. The second leg 184 includes a straight portion 200 and a first angled portion 202 that extends between the vertex 186 and the straight portion 200. The straight portion 200 and the angled portion 202 are joined at a first bend 204. The second leg 184 also includes a connection segment 208 that is angled outward at a second bend 206.

Adjacent pairs of the hairpins 180 are joined by a connection 210. In this embodiment, the connection segment 198 overlays the connection segment 208 to increase the interface between the hairpins 180. The connection segments 198 and 208 may be joined by welding, soldering, or the like. Similar to the other described embodiments, the first and second legs are bent at angles alpha and beta so that the connection 210 is shifted right or left of the midpoint of the slot span 212 to create staggered connections in the windings.

Figure 9:
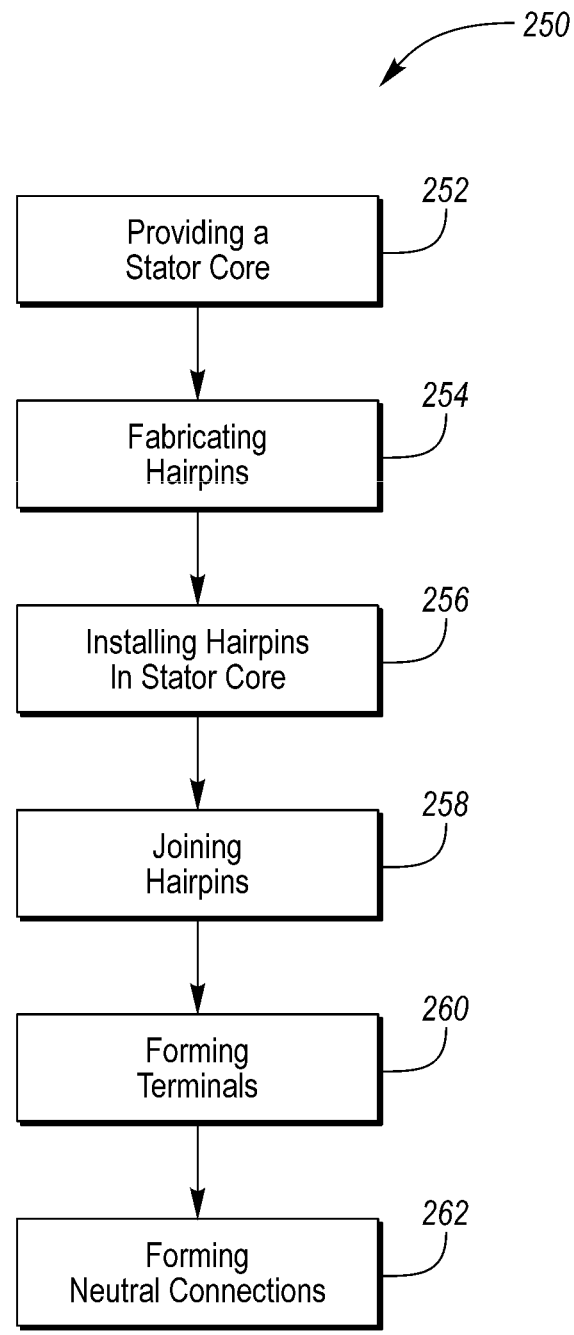
FIG. 9 is a flow chart illustrating a method for manufacturing a stator.

FIG. 9 is a flow chart illustrating a method for manufacturing a stator. At step 252 a stator core is provided. The stator core may be the same or similar to the stator core 32 described above. At step 254 the hairpins are fabricated. The hairpins may be fabricated from a blank, which may be a straight strip of metal having first and second ends and a midpoint. The blank may first be bent and twisted to form a vertex at a location that is offset from the midpoint of the blank to form first and second legs having different lengths. Alternatively, the vertex may be located at the midpoint of the blank. Additional bending and twisting may then be performed to fabricate the first bends, e.g., 132 and 142 shown in shown in FIG. 6.

At step 256, the hairpins are installed in the stator core by inserting the first and second legs into corresponding ones of the slots. The hairpins may all be inserted from a same end so that the vertexes are all located on one end of the stator and the connections are located on the other end of the stator. The hairpins of the various layers may be installed in different orientations so that the connections are shifted in different directions in the different layers. For example, the hairpins in the inner and outer layers may be installed in a different orientation than the hairpins in the middle layer. In one embodiment, the hairpins of the inner and outer layers are installed with the longer, second leg leading in the clockwise direction, and the hairpins of the middle layer are installed with the longer, second leg leading in the counter-clockwise direction. Thus, the hairpins of the middle layer have a flipped orientation compared to the hairpins of the inner and outer layers. Once inserted, the legs of the hairpins are bent and twisted to form the connection segments. As described above, the first and second legs of each hairpin are bent to have a different angle, e.g., alpha and beta, so that the connections are offset from a midpoint of the span.

At step 258, the ends of associated hairpins are joined at a connection. The connection may be formed by welding, soldering, or the like. At step 260 the paths of each phase are joined together forming a terminal. In the example three-phase electric machine 20, three terminals will be formed each corresponding to one of the three phases. The terminals are used to connect the electric machine 20 to the inverter. At step 262 the neutral connections are formed. The neutral connection may be strip(s) of metal that connects to each of the paths. Applicant's co-pending U.S. application Ser. No. 15/871,615 filed Jan. 15, 2018, describes example terminals and the neutral connections in more detail.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric machine comprising:
a stator core defining slots; and
hairpins, each having a first leg and a second leg that is longer than the first leg, disposed in the slots and selectively joined to form windings, wherein adjacent pairs of first and second ones of the hairpins are interconnected such that the first leg of the first hairpin is joined to the second leg of the second hairpin at a connection, wherein the first leg of the first hairpin is circumferentially spaced from the second leg of the second hairpin by a span of slots, and the connection is offset by a quarter of a slot from a midpoint of the span due to the second leg being longer than the first leg.

2. The electric machine of claim 1, wherein the windings include at least first and second radial layers, and the second layer is radially outboard of the first layer.

3. The electric machine of claim 2, wherein the first layer is an inner layer, the second layer is a middle layer, and the winding further includes an outer layer, and wherein the connections of inner and outer layers are circumferentially aligned to form radially extending rows of the connections.

4. The electric machine of claim 3, wherein the connections of the middle layer are located to be halfway between an adjacent pair of the rows.

5. The electric machine of claim 2, wherein the hairpins of the first layer are disposed in the stator core in a first orientation and the hairpins of the second layer are disposed in the stator core in a second orientation.

6. The electric machine of claim 1, wherein each of the first legs have a first straight portion and a first connection portion joined at a first bend, and each of the second legs has a second straight portion and a second connection portion joined at a second bend, wherein the first and second bends have different angles.

7. The electric machine of claim 6, wherein the first connection portion is longer than the second connection portion.

8. The electric machine of claim 6, wherein the first connection portion is folded over the second connection portion.

9. The electric machine of claim 1, wherein the connections are welds.

10. An electric machine comprising:
a stator core defining slots; and
windings including a plurality of winding paths corresponding to one of three phases of the electric machine, each winding path including interconnected hairpins that each have a first leg and a second leg that is longer than the first leg, each of the hairpins being disposed in the slots with the first and second legs extending through corresponding ones of the slots; wherein
adjacent pairs of first and second ones of the hairpins are interconnected such that the first leg of the first hairpin is joined to the second leg of the second hairpin at a connection, wherein the first leg of the first hairpin is circumferentially spaced from the second leg of the second hairpin by a span of slots, and the connection is offset by a quarter of a slot from a midpoint of the span due to the second leg being longer than the first leg.

11. The electric machine of claim 10, wherein the connections are welds.

12. The electric machine of claim 10, wherein the first leg has a first straight portion and a first connection portion joined at a first bend, and the second leg has a second straight portion and a second connection portion joined at a second bend, wherein the first and second bends have different angles.

13. The electric machine of claim 12, wherein the angle of the first bend is larger than the angle of the second bend.

14. The electric machine of claim 12, wherein the first straight portion and the second straight portion are a same length.

15. The electric machine of claim 10, wherein the windings include at least first and second radial layers, and the second layer is radially outboard of the first layer.

16. The electric machine of claim 15, wherein the first layer is an inner layer, the second layer is a middle layer, and the windings further includes an outer layer, and wherein the connections of inner and outer layers are circumferentially aligned to form radially extending rows of the connections.

17. The electric machine of claim 16, wherein the connections of the middle layer are located to be halfway between an adjacent pair of the rows.

18. The electric machine of claim 15, wherein the hairpins of the first layer are disposed in the stator core in a first orientation and the hairpins of the second layer are disposed in the stator core in a second orientation.

* * * * *